Figure 1:
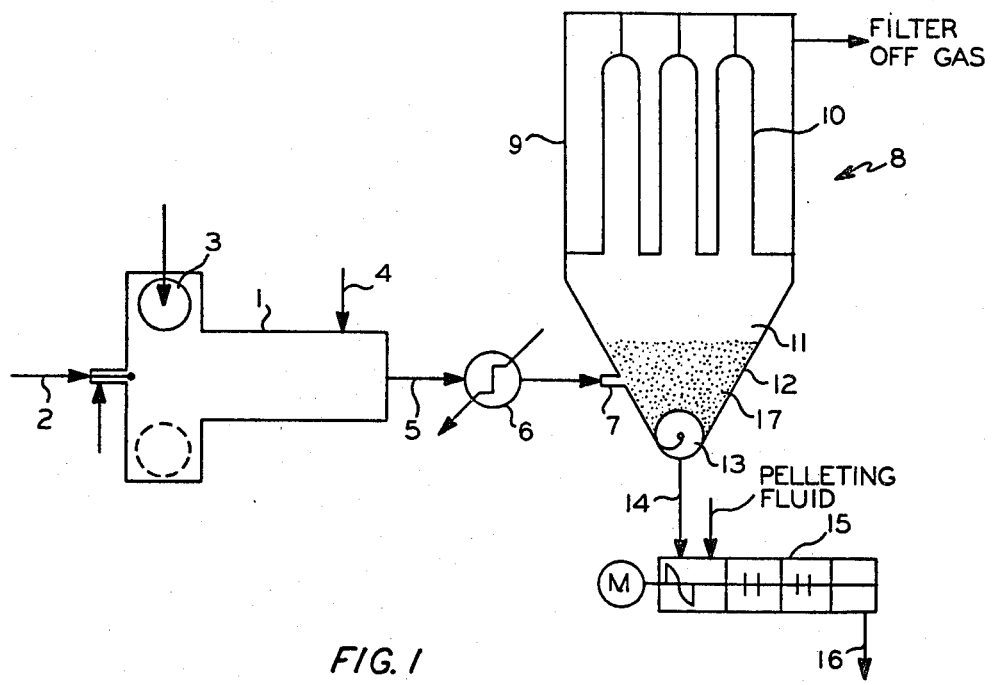

United States Patent [19]

Cheng

[11] 4,396,590

[45] Aug. 2, 1983

[54] AUTO-PRESEPARATION OF CARBON BLACK

[75] Inventor: Paul J. Cheng, Bartlesville, Okla.

[73] Assignee: Phillips Petroleum Company, Bartlesville, Okla.

[21] Appl. No.: 384,295

[22] Filed: Jun. 2, 1982

Related U.S. Application Data

[63] Continuation-in-part of Ser. No. 255,990, Apr. 20, 1981, abandoned.

[51] Int. Cl.$^3$ .................... C01B 31/02; C09C 1/48
[52] U.S. Cl. .................... 423/449; 423/450; 423/461; 55/97; 23/314
[58] Field of Search .............. 423/444, 450, 445, 461; 55/97; 106/307; 23/314

[56] References Cited

U.S. PATENT DOCUMENTS

| 2,293,113 | 8/1942 | Carney | 23/314 |
|---|---|---|---|
| 2,719,135 | 9/1955 | Wood | 423/461 |
| 2,771,158 | 11/1956 | Bray et al. | 55/97 |
| 2,776,725 | 1/1957 | Wood | 57/124 |
| 2,864,674 | 9/1958 | King | 23/314 |
| 3,017,249 | 1/1962 | Marsh | 423/450 |
| 3,328,131 | 6/1967 | Lathan | 23/314 |
| 4,295,867 | 10/1981 | Shopin et al. | 55/288 |

*Primary Examiner*—O. R. Vertiz
*Assistant Examiner*—Gregory A. Heller

[57] ABSTRACT

Aerosols such as a carbon black containing smoke are subjected to an auto-preseparation by passing the aerosol or smoke through loose particles collected and accumulated and only thereafter passing the aerosol or smoke through a separator such as a filter bag. This changes the characteristic of the aerosol in either reducing the total content of solids or increasing the average particle size of the solids in the aerosol or achieving both of these features. Thereby the load on the downstream separator and the capacity of the separator, e.g. a carbon black filter house, is substantially reduced.

14 Claims, 5 Drawing Figures

AUTO-PRESEPARATION OF CARBON BLACK

This is a continuation-in-part application of my copending patent application Ser. No. 255,990, filed Apr. 20, 1981, now abandoned.

This invention relates to the separation of aerosols. More specifically the invention relates to a process for separating solid particles from an aerosol. More specifically yet, the invention is directed to the production of carbon black and specifically the separation of carbon black from carbon black containing smoke.

BACKGROUND OF THE INVENTION

A variety of procedures and apparatuses have been described in the art for separating aerosols. The individual techniques vary substantially depending upon the nature of the aerosol. Filtration, electroseparation, and cyclone separation are just a few of these techniques.

In many of the aerosol separating techniques, and particularly in filtration procedures, the problem arises that the separator becomes less and less effective during the separation phase. This can for instance occur due to the plugging of the filter material with the solids to be removed from the aerosol as well as by the growth of a filter cake of increasing thickness.

Particularly, in the production of carbon black the carbon black containing smoke is passed through filter bags. The filtration capacity for a given bag filter is a function of the particulates' concentration and the nature of the smoke. Specifically, the agglomerate size is a feature that has influence on the filtration capacity of a bag filter.

One solution that has been proposed to increase the separator efficiency employs a fluidized bed of carbon black pellets through which the carbon black containing smoke is passed. Such a unit is described in U.S. Pat. No. 2,864,674. Whereas this system is believed to constitute a significant contribution to the art it requires a separate carbon black pellet circulating system. Furthermore, the process is carried out under wet conditions thus requiring the materials confining the fluidized bed of carbon black pellets as well as related equipment to be produced from specific corrosion resistant material.

THE INVENTION

It is thus one object of this invention to provide a process for separating aerosols in which the efficiency of an aerosol separator is increased by utilizing simple and relatively inexpensive means.

Another object of this invention is to provide an aerosol separating process wherein during an auto-preseparation the physical nature of the aerosol is changed in order to increase separation efficiency of the downstream separator.

A further object of this invention is to provide a process for removing carbon black particles from a carbon black containing smoke, particularly under non-corrosive operative conditions.

Still another object of this invention is to provide an apparatus for carrying out this separation process.

These and other objects, details, features, advantages and embodiments of this invention will become apparent to those skilled in the art from the following detailed description of the invention, the appended claims and the drawing in which FIG. 1 is a schematic view of a carbon black production unit containing the inventive auto-preseparation feature.

Figure 2:
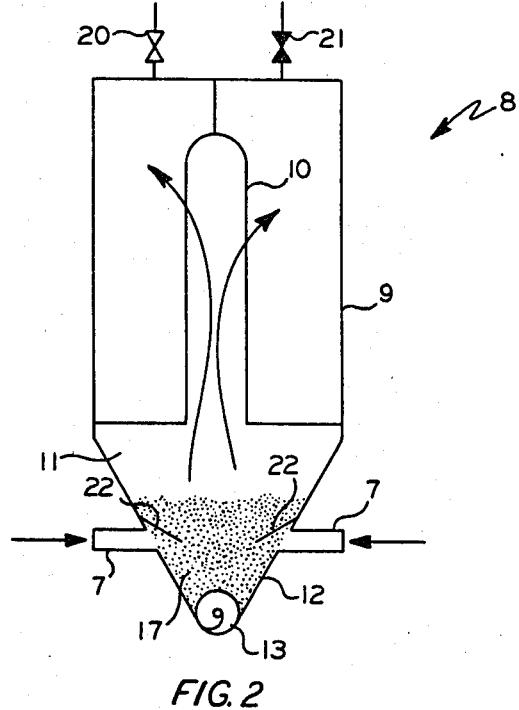
Figure 3:
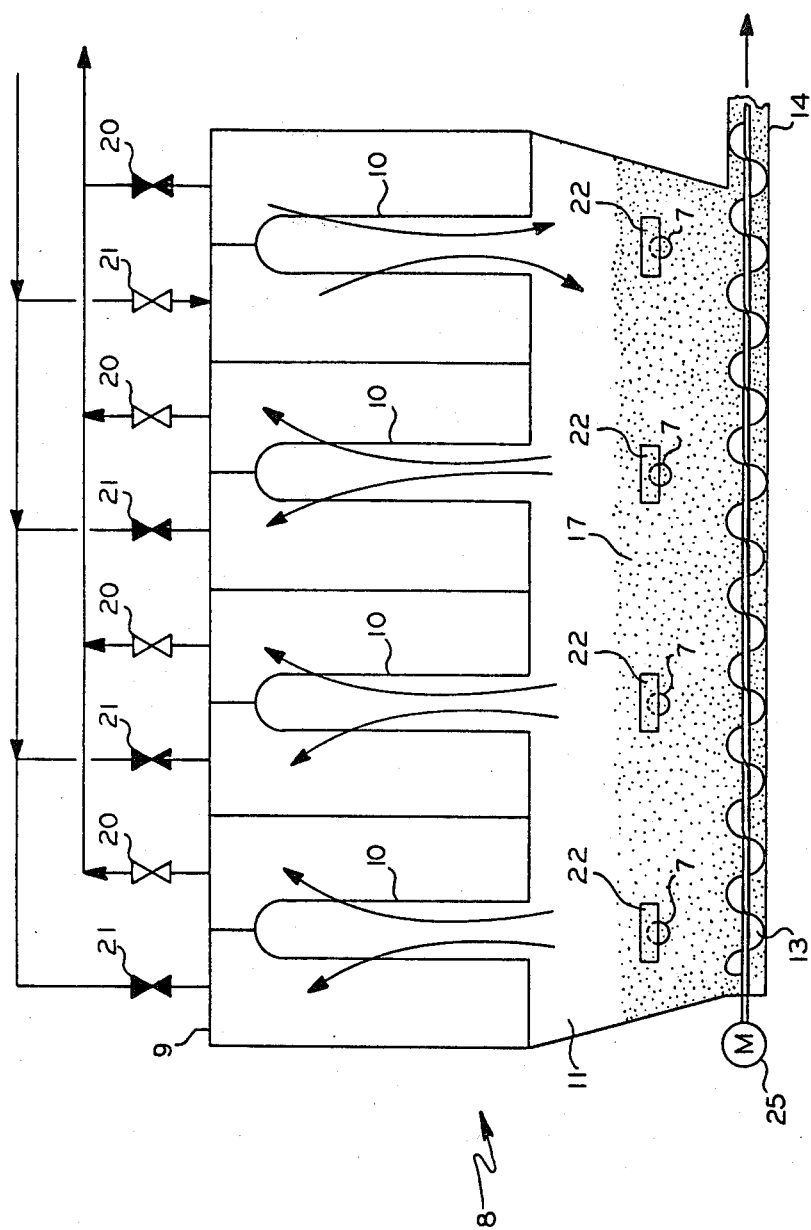

FIGS. 2 and 3 are schematical front and respectively side views of a portion of a carbon black filter house.

Figure 4:
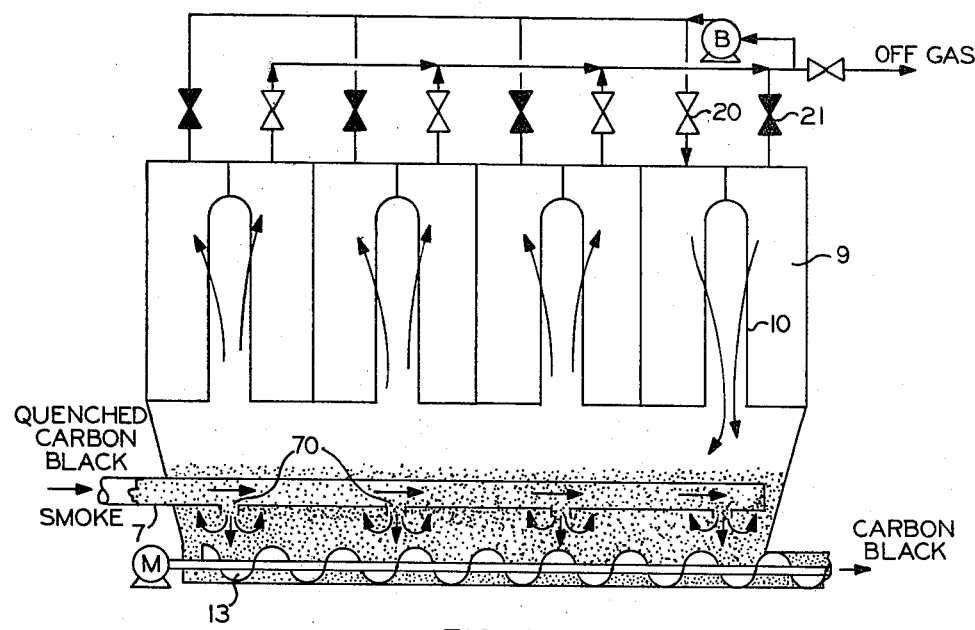
Figure 5:
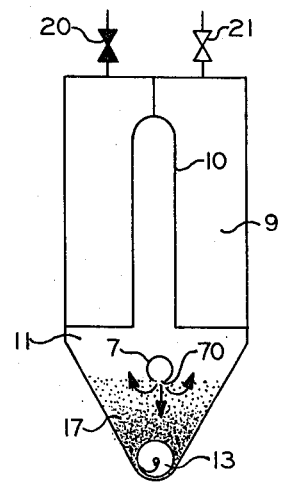

FIGS. 4 and 5 schematically show respectively a sideview and an endview of a portion of a carbon black filter house containing a further embodiment of the invention.

In accordance with this invention it has been found that an aerosol separation process wherein an aerosol is passed through a separator to separate loose particles from the aerosol can be substantially improved by passing the aerosol first through a mass of accumulated loose particles removed from this separator and thereafter through the separator. By this procedure the aerosol is pretreated in a step that can be called auto-preseparation because the aerosol is contacted with the solid material which has just been removed from the separator. The so-modified aerosol which leaves the accumulated loose solids through which it has been passed differs from the original aerosol either in the fact that the total solids load is less than, i.e. the density of the modified aerosol is less than that of the original aerosol (less particles in a volume of gas) or that the average particle size in the modified aerosol is larger than that of the original aerosol, or in that both of these features occur simultaneously.

The mass of accumulated, loose particles is characterized by the fact that the separated solid particles have settled by gravity to form this mass. The particles from the separator prior to their forming said mass have not been subjected to any treatment changing their physical properties (e.g. particle size, adhesion, cohesion) and are essentially in a non-turbulent state in this mass.

In accordance with a first embodiment of this invention an aerosol separation process is provided which comprises passing the aerosol consisting of loose particles and gas through a loose mass of such loose particles which have been withdrawn from a separator and accumulated as said mass. Thereby a modified aerosol is produced which consists of loose particles and the gas, but having a composition differing from the aerosol passed into said mass. Either the density of the modified aerosol is less than the density of the original aerosol and/or the average size of the loose particles of the aerosol is larger than for the original aerosol. The so-modified aerosol is then passed through the separator to produce a gas depleted of loose particles. These loose particles then are removed from the separator. The total mass of loose particles used for the auto-preseparation is kept approximately constant by adding and/or withdrawing loose particles from this mass. This adding or withdrawing of loose particles from the mass can be done continuously or in intervals. Usually, the mass is continuously removed from the operation, as by an auger or pneumatic conveying, at a rate about equal to the accumulation of the mass, as from the separator and from particles removed from the aerosol during contact with the mass, in order to maintain a desired depth of the mass accumulated in the collection chamber.

In the preferred operation the modified aerosol has both a reduced density (reduced pounds of solids per cubic foot of gas) and an increased average particle size as compared to the original aerosol. Essentially all of the loose particles separated from the modified aerosol in the separator can be added to this loose mass and an amount of loose particles equivalent to the quantity of particles from the separator plus the difference between the particle content of the original aerosol and that of the modified aerosol is withdrawn from the loose mass. Preferably, the addition of the particles to the loose mass from the separator and the withdrawal from the loose mass occurs at opposite ends of the loose mass. Usually the loose particles from the separator are added to the mass from the top and particles withdrawn are removed from the bottom of the loose mass.

Whereas a wide variety of separators can be used in connection with this invention, it is presently preferred to utilize a bag filtration unit. The aerosol is passed through the filter and the material collected on the filter is removed. This removal of filter material is generally done periodically by such operations as backflowing the filter, i.e. passing a backflow gas in opposite direction to flow of the aerosol through the filter, pulse jets, or shaking the filter.

The construction of the unit to be used becomes particularly simple when the separator is arranged above a collecting chamber so that the loose particles can simply fall from the separator into the collecting chamber through which the aerosol then passes prior to reaching the separator.

The presently preferred embodiment of this invention consists in a process to produce carbon black. In this process a smoke containing first carbon black particles is produced by decomposition or respectively incomplete combustion of a carbon black feedstock. A mass of loose, flocculent carbon black is provided and at least a portion of the smoke is passed into said mass. From this mass a modified aerosol stream comprising the gas phase of the smoke and second carbon black particles from the mass is withdrawn. The modified aerosol is introduced into a separator to produce a carbon black product composed essentially of the second carbon black particles and a gas substantially depleted or essentially free of carbon black.

The mass of loose, flocculent carbon black is preferably provided in at least one collecting chamber in which the dry, loose, flocculent carbon black from the separator is collected. The collection of the carbon black in the collecting chamber becomes particularly simple when the separator is arranged above the collecting chamber so that the carbon black particles can simply fall from the separator into the collecting chamber. The collecting chamber in which the auto-preseparation of the carbon black containing smoke by contacting this smoke with accumulated but loose flocculent dry carbon black has essentially two functions. The chamber acts as a filtration and separation unit wherein the carbon black containing smoke is contacted with "its own" loose carbon black particles. Thereby the carbon black content of the smoke can be reduced. Furthermore the carbon black particles actually leaving the mass and entering the separation system, e.g. the filter bag, has a substantially larger average particle size than that of the original smoke. Finally the chamber has the function of a settling zone in which larger carbon black particles settle and from which ultimately the carbon black particles are withdrawn.

The operating conditions for the auto-preseparation in this carbon black production process are not particularly critical. It is, however, presently preferred to carry out the entire separation at a temperature of 400° F. or higher to avoid any moisture condensation in the filter house. The upper limit for the preferred temperature range is given also by practical considerations. The temperature should not be so high as to cause any damage to the separation equipment. For this reason the carbon black containing smoke coming from the furnace is first quenched and usually cooled before the separation steps. The temperature in the separation steps is preferably below about 500° F.

An important feature of this invention resides in the fact that the carbon black that is accumulated from the separator is loose, dry, flocculent carbon black. Generally, the density of this accumulated, loose, dry, flocculent carbon black is less than five $lbs/ft^3$ (e.g. 0.5 to 5 $lbs/ft^3$) and usually within the range of about 2 to 3 $lbs/ft^3$.

The particle size of cabon black in the smoke entering the auto-preseparation zone is approximately 0.01 to 0.5 microns; typical small particle black such as N110 has an average particle diameter of 0.02 to 0.03 microns whereas large particle blacks such as N990 has an average particle diameter of 0.2 to 0.4 microns. The loose, dry, flocculent carbon black accumulated from the separator with which the smoke is contacted in the auto-preseparation step has an average particle size in the range of about 10 to 40 microns.

The carbon black containing smoke or aerosol is passed through conduits and released into the accumulated mass of particles so that the aerosol or smoke has to flow through a substantial portion of this mass. It is frequently desirable to release the aerosol or smoke in the lower portion of the accumulated mass and to withdraw the modified aerosol from near the top or at the top of the accumulated mass.

In one variation of the carbon black separation embodiment, the carbon black containing smoke is entered into the filter house downwardly, preferably essentially vertically downwardly. The smoke thereby contacts and mixes with accumulated loose carbon black particles in the collecting area below the filter bags. The smoke is injected, in other words, in a direction opposite to where the gas ultimately is supposed to go. The smoke is directed away from the filter bags into the bottom of the collecting chamber and the smoke then reverses its flow direction and after contacting the loose carbon black particles flows into the filter bags. The point of release of the smoke, e.g. the downwardly facing holes in smoke carrying pipes, can be above the accumulated loose, dry, flocculent carbon black. The release velocity or injection velocity of the smoke is such that the smoke travels a substantial distance downwardly before the gas flow is reversed in upward direction and toward the separator (e.g. the filter bags).

A still further embodiment of this invention resides in an apparatus for carrying out the process of this invention. This apparatus comprises a source of an aerosol, at least one collecting chamber for collecting loose particles, a conduit connecting the source and the collecting chamber, where the conduit opens into the collecting chamber at a locus where the aerosol contacts a substantial portion of the collected or accumulated loose particles. Separator means are provided for and connected to the collecting chamber and adapted to separate the particles from the aerosol and thus to generate particulate material and an off-gas. Conduit means are connected to the separator means and the collecting chamber which permit the loose particles to be conveyed from the separator means to the collecting chamber and also permitting the aerosol having passed through the accumulated particles to pass to the separator means. The separator means preferably are filter means. In the case of a carbon black unit these filter means comprise a large number of filter bags which are arranged vertically with their longitudinal axis. The filter means are preferably arranged above the collecting chamber or chambers. In this case the conduit means mentioned are the walls enclosing the space between the filter means and the collecting chamber. This collecting chamber preferably comprises downwardly converging walls. Conveying means are associated with the lowest section of the collecting chamber and the conduit for introducing the aerosol or carbon black containing smoke is arranged so that the aerosol or smoke will enter the collecting chamber in the vicinity of the lowest section thereof. Depending upon the size of the conduit and the pressure drop it may be advantageous to provide a deflector plate within the collecting chamber to avoid a "blowing through" of the aerosol or smoke. Such deflector plates will cause the smoke to be dispersed and thus will cause a relatively even flow of the smoke throughout the accumulated particles in the collecting chamber.

In a variation of the carbon black apparatus embodiment of this invention a carbon black filter house comprising a plurality of filters and one or more collecting chambers beneath the filters is further improved in accordance with this invention. A conduit (e.g. a pipe) for injecting the carbon black containing smoke into the filter house is provided which has or is connected to one or more openings facing downwardly, i.e. away from the filters. The cross section of these openings is such that a substantial pressure drop occurs across these openings so that the carbon black containing smoke enters the chamber below the filters at a significant speed. Thereby the preagglomeration or auto-preseparation of the carbon black particles in the smoke is enhanced since substantial contact between these particles and the loose carbon black particles is provided. Most preferably in this variation the filter house is subdivided into a plurality of compartments, each compartment containing a large number of filter bags. The carbon black containing smoke is introduced through a smoke header which may be a pipe or a system of pipes. Under each of the compartments a downwardly facing hole in the smoke carrying pipe is provided. This hole, in other words, faces away from the filter bag compartment and into the area where the loose, flocculent, dry carbon black is accumulated below the filter bag compartment.

In summary the invention is based on the fact that the lower the concentration and the larger the particle size introduced into the filter, the higher the capacity of the filter will be. In the case of carbon black, the smoke passes through a layer of loose black which is already collected on the bottom of the filter bag house and from there into the filter bag. This prefiltration and preagglomeration step accomplishes two things simultaneously. First, the loose black layer captures a part of the black particles thus reducing the particulate concentration in the stream. Secondly, while going through the dense phase black layer the particles in the stream further agglomerate to a larger size and thus become easier to separate at the bag filter and have less tendency to plug the pores of the filter material. Both of these features promote the filtration capacity and thus allow a reduction in the filtration costs.

The following description of the drawing and the specific examples are intended to further illustrate the invention and preferred features thereof but not to unduly limit its scope.

FIG. 1 schematically illustrates a carbon black production system. In a furnace 1 a hydrocarbon feedstock such as an aromatic oil introduced via conduit 2 is converted into a carbon black containing smoke by contacting the oil with hot combustion gases tangentially introduced into the reactor via conduit 3. The carbon black forming reaction is stopped by quenching the smoke e.g. with water or a gas, such as cooled smoke, introduced via conduit 4. The cabon black containing smoke is withdrawn from the reactor via conduit 5, further cooled in heat exchanger 6 and is finally introduced via conduit 7 into the filter system 8. This filter system comprises a housing 9 in which a large number of filter bags 10 are vertically arranged with their open ends facing downwardly. Below the housing 9 a collecting chamber 11 confined by converging walls 12 is arranged in open communication with the housing 9.

At the lower end of the collecting chamber 11 is a carbon black withdrawal means 13 such as an auger or pneumatic conveying means, by way of a star valve. From this lower section of the collecting chamber 11 the carbon black is conveyed via a conduit 14 to a pelleter 15 wherein the loose and flocculent carbon black is pelleted and the final pelleted product is withdrawn via line 16. A surge vessel (not shown) is often used between withdrawal means 13 and the pelleter 15.

In accordance with this invention the carbon containing smoke is introduced into the collecting chamber 11 at an elevation close to the lower end of the collecting chamber 11. Thus the carbon black containing smoke first contacts, during its passage to the filter bags 10, the accumulated loose carbon black mass 17. This results in a auto-preseparation and agglomeration of the particles in the aerosol and thus in an increase of particle size of the carbon black which ultimately reaches the inside of the filter bags 10.

FIGS. 2 and 3 show a variation of the separation system 8 in a front and a side view. The filter bags 10 are arranged in chambers 9. The off-gas leaves these chambers via a valve 20 and backflow gas can be introduced into chamber 9 via a valve 21. Thereby the carbon black collected inside of the filter bag is to a substantial extent removed from the bag and falls into the collecting chamber 11.

In this embodiment of FIGS. 2 and 3 a plurality of conduits 7 for the introduction of carbon black containing smoke is shown to assure an even distribution of the smoke throughout the loose accumulated carbon black. Each inlet conduit 7 is provided with a deflector plate 22. This deflector plate prevents the smoke from "tunnelling" through the loose black on top of it and causes a better distribution and a more turbulent flow of the smoke through the loose carbon black bed 17.

The auger 13 is driven by a motor 25 and conveys the accumulated carbon black via conduit 14 to further processing, such as pelleting. The quantity of carbon black removed is equal to the quantity of carbon black introduced via conduits 7 (assuming no loss through the filter bags 10.)

In the embodiment of a carbon black filter house which schematically is shown in a side view in FIG. 4 and in an end view in FIG. 5, the carbon black containing quenched smoke enters the filter house via a pipe 7. Typically this pipe 7 can have an outside diameter of 24 inches. The filter house comprises a plurality of filter compartments or chambers 9. In FIGS. 4 and 5 only one filter bag 10 is shown for each compartment 9. It is, however, preferred that each of the filter compartments 9 contains a large number of such filter bags 10, e.g. several hundreds. The smoke inlet pipe 7 is provided with several openings 70 which may be circular openings having a diameter of e.g. 7⅞". Each filter chamber 9 is associated with one of these openings 70. The openings 70 face downwardly, and preferably vertically downwardly, i.e. away from the filter chamber or compartment 9. The carbon black containing smoke leaves the pipe 7 through the opening 70 at a high speed in downward direction. The gas will eventually reverse its flow and follow the pressure gradient and flow through the filter bags 10. This flow is schematically indicated by the arrows in the drawing.

Without limitation to the scope of this invention it is presently believed that the smoke leaving the openings 70 is subjected to a preagglomeration in which the carbon black particles in the smoke increase in size. It has been found that the actual filter bag load is substantially reduced by the invention. The loose carbon black mass 17 which is accumulated in the lower portion of the collecting chamber 11 is removed with an auger 13 for further processing, e.g. pelleting or packaging.

EXAMPLE

A commercial carbon black operation has been used to test the invention. In a first run the commercial plant was operated as originally designed. In this run the carbon black containing smoke was introduced into the collecting chamber 11 at a high elevation of about 12 feet above the auger or valve 13 (above the accumulated mass 17). Then in a second run the smoke inlet pipe was moved 8 feet downward toward the valve or auger 13. This caused the carbon black containing smoke to contact the loose, accumulated carbon black 17 in the collecting chamber 11. The pressure drop across the filter bag has been measured for both runs both at the beginning (essentially no filter cake built up) and at the end of the filtration (after filter cake has built up). The results are shown in the following table.

TABLE

|  | ΔP Across Bags, Inches H₂O | |
|---|---|---|
|  | Start of Filtration | End of Filtration |
| First Run | 9 | 13 |
| Second Run (Invention) | 2 | 4 |

Since the bag house can be operated at the 13 inches of water final ΔP, as in the first run, the rate of smoke charged in the second run (invention run) can be more than doubled to obtain this same final 13 inches of water ΔP.

The invention allows twice as much carbon black recovery in the same apparatus (except for the locus of smoke introduction) during the same filtration time. Or, for the same rate of smoke charged, for the same amount of carbon black recovery during the same filtration time, for the 13 inches of water ΔP, the invention requires only about one-half the number of bags.

Reasonable variations and modifications which will become apparent to those skilled in the art can be made in this invention without departing from the spirit and scope thereof.

I claim:

1. A process to produce carbon black comprising
   (a) producing a smoke containing first carbon black particles by decomposition or respectively incomplete combustion of a carbon black feedstock,
   (b) providing a mass of loose, flocculent, dry carbon black,
   (c) passing at least a portion of said smoke into said mass,
   (d) withdrawing an aerosol stream comprising the gas phase of said smoke and second carbon black particles from said mass,
   (e) introducing said aerosol into a separator to produce a carbon black product composed essentially of said second carbon black particles and an essentially carbon black free gas phase.

2. Process in accordance with claim 1 wherein said mass is provided in at least one collecting chamber wherein dry, loose, flocculent carbon black from the separator is collected.

3. Process in accordance with claim 1 wherein said mass of loose, flocculent, dry carbon black is essentially unagglomerated and unpelletized and is held in position essentially by gravity.

4. Process in accordance with claim 2 wherein said collecting chamber is arranged below the separator.

5. Process in accordance with claim 4 wherein said separator is a filter system.

6. Process in accordance with claim 1 wherein at least a portion of said carbon black product from said separator is added to said mass of loose, flocculent, dry carbon black and wherein a portion of said mass is withdrawn for further processing.

7. Process in accordance with claim 6 wherein the quantity of carbon black added to the mass by said portion of said carbon black product as well as by the carbon black containing smoke flowing through said mass and the quantity of carbon black withdrawn from said mass by said portion of said mass are essentially equal.

8. Process in accordance with claim 5 wherein said further processing includes a pelleting operation to convert the loose, flocculent, dry carbon black into carbon black pellets.

9. Process in accordance with claim 5 wherein said carbon black containing smoke is passed into at least one collecting chamber below said filter system and at a location so that the smoke flows through a substantial portion of the mass of loose, flocculent, dry carbon black collected from the filter system in the collecting chamber.

10. Process in accordance with claim 9 wherein said collecting chamber comprises downwardly conveying walls, wherein conveying means are associated with the lowest section of said collecting chamber or chambers and wherein said smoke is introduced into said collecting chamber in the vicinity of said lowest section.

11. Process in accordance with one of the preceding claims wherein said smoke is injected into a filter house comprising a plurality of filters and one or more collecting chambers below said filters in downward direction away from said filters and into said collecting chamber wherein said smoke contacts said mass of loose, flocculent, dry carbon black.

12. Process in accordance with claim 11 wherein said smoke is injected in downward direction from a plurality of downwardly facing outlets arranged inside of said filter house and connected to a pipe.

13. A process in accordance with claim 12 wherein said outlets are openings in said pipe, with the proviso that these openings are facing in downwardly direction.

14. Process in accordance with claim 12 wherein the direction of smoke injection is essentially downward.

* * * * *